Dec. 11, 1951     O. J. MOEHLER     2,577,855
METHOD OF MAKING SEPARABLE END STOP FOR SLIDE FASTENERS
Filed Oct. 30, 1946                            2 SHEETS—SHEET 1
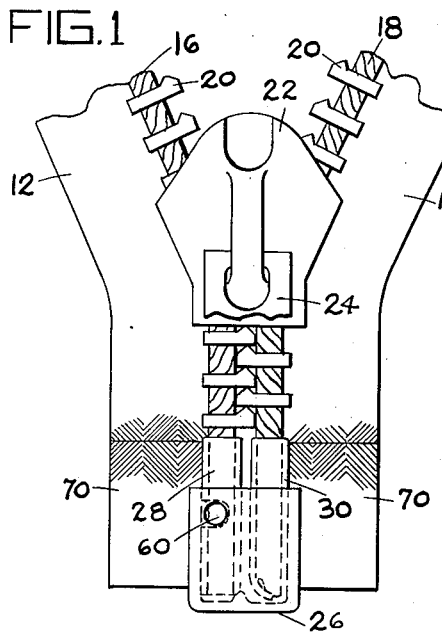
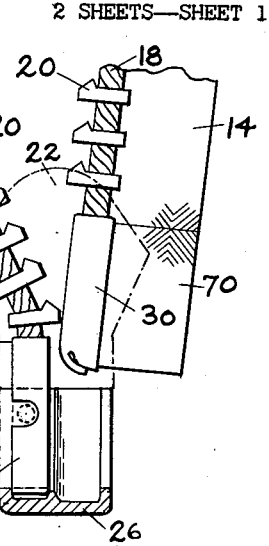
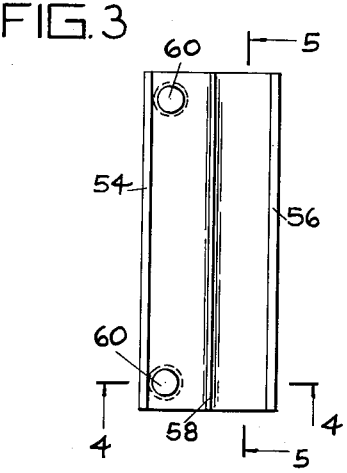
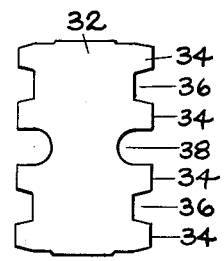
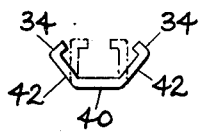
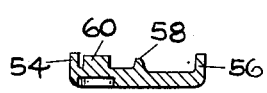
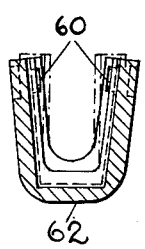
INVENTOR.
Otto J. Moehler,
BY James and Franklin
ATTORNEYS Dec. 11, 1951   O. J. MOEHLER   2,577,855
METHOD OF MAKING SEPARABLE END STOP FOR SLIDE FASTENERS
Filed Oct. 30, 1946   2 SHEETS—SHEET 2
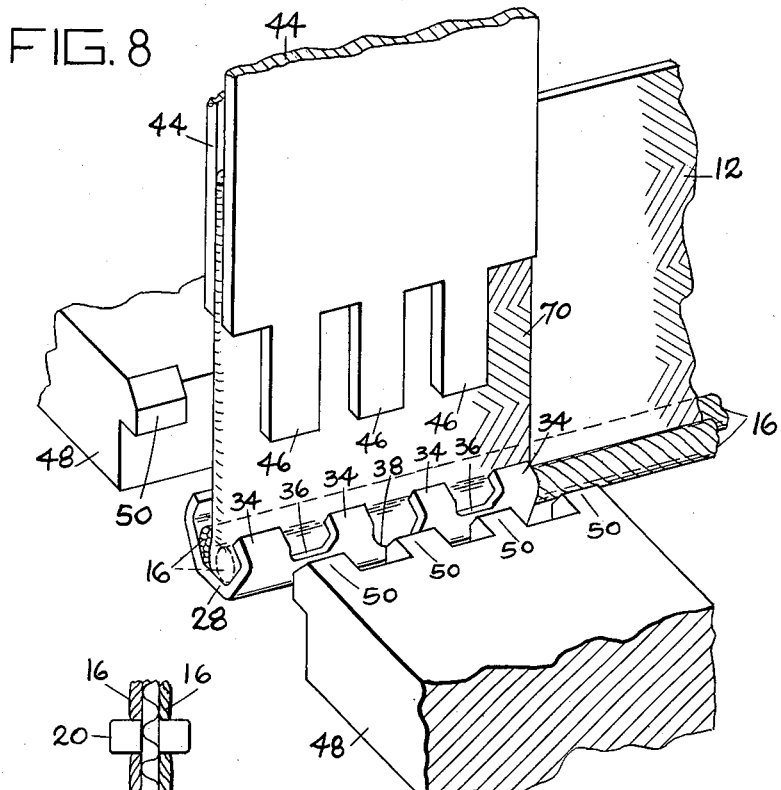
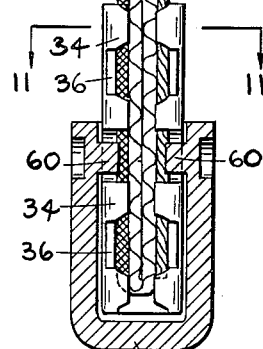
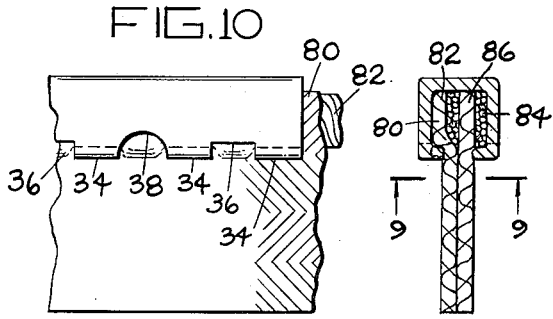
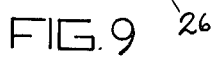
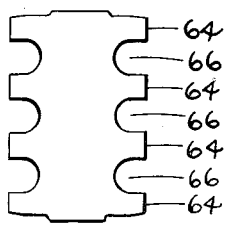
INVENTOR.
Otto J. Moehler
BY James and Franklin
ATTORNEYS Patented Dec. 11, 1951

2,577,855

UNITED STATES PATENT OFFICE 2,577,855

METHOD OF MAKING SEPARABLE END STOP FOR SLIDE FASTENERS

Otto J. Moehler, Newark, N. J., assignor to Conmar Products Corporation, Newark, N. J., a corporation of New Jersey Application October 30, 1946, Serial No. 706,544

1 Claim. (Cl. 29—148)

This invention relates to slide fasteners, and more particularly to a separable bottom end stop for the same.

The primary object of the present invention is to generally improve separable bottom stops for fully separable slide fasteners. A separable bottom stop of the type here considered comprises a clip clamped over a stud on one tape or stringer, said clip removably receiving a pin on the other tape or stringer.

More particular objects of the invention are to strengthen the attachment of the stud to the tape, and the attachment of the clip to the stud.

Further objects of the invention are to simplify the manufacture and handling of the stud, and the manufacture and handling of the clip.

Still further objects of the invention are to facilitate assembly of the stud with the tape, and assembly of the clip with the stud.

To accomplish the foregoing general objects, and other more specific objects which will hereinafter appear, my invention resides in the separable bottom stop elements and their relation one to the other, as are hereinafter more particularly described in the following specification. The specification is accompanied by drawings, in which:

Fig. 1 shows the lower end of a slide fastener having a separable bottom stop embodying features of the invention;

Fig. 2 is a section through the bottom stop, with the pin separated from the clip, the slider being shown only in phantom;

Fig. 3 illustrates a channeled blank for the clip;

Fig. 4 is a section through the blank, taken approximately in the plane of the line 4—4 of Fig. 3;

Fig. 5 is a longitudinal section, taken approximately in the plane of the line 5—5 of Fig. 3, but with the blank bent up to V shape;

Fig. 6 illustrates a sheet metal blank for the stud;

Fig. 7 is an end elevation of the stud in open condition;

Fig. 8 is a perspective view illustrating the method of tucking the beaded edge of the tape into the stud, and simultaneously closing the stud about the beaded edge;

Fig. 9 is a section outside the stud, taken approximately in the plane of the line 9—9 of Fig. 11, but with the clip added in section;

Fig. 10 is a side elevation of the tape and stud, looking from the left side of Fig. 11;

Fig. 11 is a section taken approximately in the plane of the line 11—11 of Fig. 9; and Fig. 12 shows a modified blank from which the stud may be formed.

Referring to the drawing, and more particularly to Figs. 1 and 2, the slide fastener comprises stringers 12 and 14 each made up of tapes having beaded or corded edges 16 and 18 carrying interlockable fastener elements or so-called "scoops" 20. The scoops are meshed or unmeshed by means of a slider 22, which may be of conventional character, and which is manipulated by means of a finger-piece or so-called "pull" 24, most of which has been broken away in Fig. 1. The slide fastener is of the fully separable type, that is, the bottom stop is designed to come apart. More specifically, the bottom stop comprises a clip 26 permanently clamped over a stud 28 secured to the beaded edge 16 of tape 12, said clip removably receiving a pin 30 secured to the beaded edge 18 of the tape 14. Whenever the slide fastener is partially or wholly closed, the pin 30 is in the clip 26, as shown in Fig. 1, but when the fastener is to be fully separated, the slider 22 is run down to lowermost position, thereby permitting the pin 30 to be moved out of the clip 26, as shown in Fig. 2 of the drawings.

The stud 28 may be made of a blank of sheet metal having either the shape shown in Fig. 6 or the shape shown in Fig. 12. For convenience, the blank shown in Fig. 6 is referred to first. This blank 32 is crenelated along its side edges, that is, it is provided with a series of blunt or relatively square teeth 34, spaced apart by relatively wide notches 36 and 38. The blank is made symmetrical end for end, as well as side to side. The number of notches along each side is preferably an odd number, in this case three, thus causing the central notch 38 to be located half-way between the ends of the blank. The blank is folded to a trough shape, as is best shown in Fig. 7, this comprising a face wall 40 with side walls 42 and teeth 34. When the stud is clamped about the beaded edge of the tape, the side walls 42 are forced together, somewhat as shown in broken lines.

One advantage of the use of crenelations or wide notches, will be clear from inspection of Fig. 8, which schematically shows the method of attaching the stud to the tape. The beaded edge 16 of tape 12 is stuffed into the open stud 28 by means of tuck-in blades 44 disposed on opposite sides of tape 12. These tuck-in blades have teeth 46 which correspond to the notches 36 of stud 28, hence the beaded edge may be pushed forcibly into the stud without interference by the teeth 34. The stud is closed about the beaded edge 16 by a pair of oppositely moving clamping jaws 48, and these also are notched to provide teeth 50 which correspond to and bear against the teeth 34 of the stud. The teeth 46 and the teeth 50 are relatively staggered, and clear each other during the closing operation; consequently the tuck-in blades will hold the beaded edge well inside the stud while the teeth and walls of the stud are being closed around said beaded edge.

With studs having smooth side edges, or having side edges with small serrations, it was heretofore necessary to retract the tuck-in blades during closing of the clamping jaws, whereas with the present arrangement the tuck-in blades may be kept in advanced position during the entire clamping operation. However, after the tuck-in blades are retracted, the beaded edge 16 tends to expand or swell in the notches between the teeth 34, thereby anchoring the stud on the tape securely against longitudinal or endwise movement.

The clip 26 is formed from a blank 42, best shown in Figs. 3 and 4. This blank has a cross-section which includes side flanges 54 and 56, and a longitudinal ridge 58 therebetween. The blank may be a short length severed from a continuous wire rolled to desired cross-sectional configuration. By appropriate punch and die operations, circular projections or dots 60 may be struck inwardly near the ends of the blank. It will be noted that these are formed perpendicular to the face of the blank, and therefore may be formed in a simple die using only the normal movement of the die in the main direction in which it opens and closes.

The blank is then bent to the V shape shown at 62 in Fig. 5. Because the dots 60 are located near the ends of the blank, the V may be nearly closed, thus providing a more nearly rectangular shape, and therefore one which is better adapted for hoppering in automatic machinery.

After the stud has been secured to the tape, as was previously described in connection with Fig. 8, the clip is clamped over the stud, as is best shown in Fig. 9. For this purpose, the sides of the clip are pressed together to change them from the divergent or V shape shown in Fig. 5, to the parallel or U shape shown in Fig. 9. At this time the cylindrical projections or dots 60 enter the middle notches 38 on the sides of the stud 28, thereby locking the clip against movement from the stud.

The symmetrical design of the stud greatly simplifies hoppering if the stud is to be attached in automatic machinery. It also simplifies handling of the same if it is attached with manual aid. This is so because it is not necessary to distinguish one end position from another.

A modified form of blank for the stud is shown in Fig. 12. Here again the blank is symmetrical, and produces a symmetrical stud. The side edges are crenelated or provided with blunt or relatively square teeth 64 separated by relatively wide notches 66, but in the present case the notches 66 are all alike and are all deep enough to receive the interlocking dots 60 (Fig. 3) previously referred to. It is not necessary for the end notches 66 to have so great a depth, and this fact is recognized in Fig. 6, in which notches 36 are shallower than notches 38. The stud shown in Figs. 1, 2, 8, 9 and 10 corresponds to the blank shown in Fig. 6, rather than to the blank shown in Fig. 12.

It will be understood that with a blank of the type shown in Fig. 12, the projections or dots on the clip might be so located as to enter the bottom notch 66. For this purpose a modified blank might also be made, in which the end notches 66 are deep, and the center notch shallow. The use of an end notch for interlock would have several disadvantages, one being that the clip when in open or V shape would have to be widely open, and another being that there would be less of the sheet metal of the stud beneath the dot to resist pulling of the clip away from the stud.

In this connection it may be mentioned that while desirable, it is not essential that the number of notches be odd. For example, if four notches are employed, the dots may be so located as to enter the second notch from the bottom. All of the notches may be deep, as shown in Fig. 12, or if the blank is modified as shown in Fig. 6, the two center notches are made deep, and the two end notches are made shallow. The dots on the clip are, of course, appropriately located to enter the desired one of the center notches, and the location of the notches is made symmetrical, so that the stud can be reversed end for end without upsetting the desired relation of the parts. An advantage of using the center notch of an odd number of notches, as in Fig. 6, is that only one notch need be made deep.

The tapes 12 and 14 are reversely folded at their bottom ends, as is indicated at 70 in Figs. 1, 2 and 8, in order to provide stiffened lower ends for manipulation of the parts of the separable bottom stop. It is customary to remove the cords from the reversely folded ends 70, so that there will be only two cords instead of four, and it is also customary to cement the upturned ends with a stiffening agent. This reverse folding of the ends of the tape has the additional advantage of providing a non-fraying end for the tape.

Thus on one side, the stud is clamped about an uncorded tape edge (edge 80 in Figs. 10 and 11) which is bulged out by cord 82 (Fig. 11), this being one of the two cords 82 and 84 on tape portion 86.

It is believed that the method of constructing and attaching my improved separable bottom stop, as well as the advantages thereof, will be apparent from the foregoing detailed description. The stud is symmetrical, and is therefore easier to hopper in automatic machinery, and easier to handle in semi-automatic work. Because of the crenelated edges, the tuck-in blades may be left in advanced position to hold the beaded edge tightly in the stud during closing of the stud. The crenelated edge strengthens the stud against removal from the tape by end pull, for the beaded edge tends to expand or swell in the notches.

In respect to the clip, the cylindrical projection or dot is stronger than a spur or tongue lanced inwardly from the flange, such as has heretofore been used. Moreover, the cylindrical projection or dot can be located very close to the top of the clip, whereas this could not be done with a spur lanced in from the flange, without loss of strength. This location near the top of the clip is essential if the dot is to interlock with a central notch, and that in turn is convenient if the stud is to be symmetrical and strong. The projection or dot is struck from the flat face of the clip, and this simplifies the die which forms the clip, for the dot is then formed in the direction of normal opening or closing of the die, whereas a lancing blade for lancing through the flange, must be moved in a transverse direction. The clip, even in its open or V position, may be nearly closed because of the location of the dots high on the clip, and this makes it easier to hopper the clips in automatic machinery, and requires only a relatively short closing stroke for the press which clamps the clip over the stud.

It will be understood that while I have shown and described my invention in several preferred forms, changes may be made in the structures disclosed, without departing from the spirit of the invention as sought to be defined in the following claim.

I claim:

In the manufacture of a slide fastener having a separable end stop comprising a clip clamped over a stud on one tape, for removably receiving a pin on the other tape, the method which includes forming the stud with edges each having a plurality of blunt teeth spaced apart by a plurality of relatively wide notches, tucking the beaded edge of the tape tightly into the stud by a pressure applied in the direction of the tape at spaced points at the notches between but not at the teeth, and closing the teeth about the beaded edge by pressure exerted in a direction transverse of the tape at spaced points on the teeth but not between the teeth while maintaining the aforesaid tucking pressure on said beaded edge between the teeth.

OTTO J. MOEHLER.

REFERENCES CITED

The following references are of record in the file of this patent:

UNITED STATES PATENTS

| Number | Name | Date |
|---|---|---|
| 1,784,256 | Stout | Dec. 9, 1930 |
| 1,874,457 | Corey | Aug. 30, 1932 |
| 2,005,872 | Rocke | June 25, 1935 |
| 2,037,473 | Legat | Apr. 14, 1936 |
| 2,115,369 | Marinsky | Apr. 26, 1938 |
| 2,216,794 | Ulrich | Oct. 8, 1940 |
| 2,219,045 | Kiessling | Oct. 22, 1940 |
| 2,267,079 | Clark | Dec. 23, 1941 |
| 2,397,037 | Norkin | Mar. 19, 1946 |